United States Patent
Rest et al.

(10) Patent No.: US 7,245,874 B2
(45) Date of Patent: Jul. 17, 2007

(54) INFRASTRUCTURE FOR TELEPHONY NETWORK

(75) Inventors: Yehuda Rest, Lev Hashomron (IL); Salit Drobiner Gros, Kiryat Ono (IL); Avraham Barda, Hod-Hasharon (IL)

(73) Assignee: Shiron Satellite Communications (1996) Ltd., Petach Tikva (IL)

( * ) Notice: Subject to any disclaimer, the term of this patent is extended or adjusted under 35 U.S.C. 154(b) by 1078 days.

(21) Appl. No.: 09/918,443

(22) Filed: Aug. 1, 2001

(65) Prior Publication Data
US 2003/0027567 A1 Feb. 6, 2003

(51) Int. Cl.
*H04B 7/185* (2006.01)
(52) U.S. Cl. ..................... 455/12.1; 455/502
(58) Field of Classification Search ............. 455/427, 455/12.1, 433, 417, 426, 3.01, 3.02, 13.2, 455/98, 506, 502, 445; 370/389, 310, 316
See application file for complete search history.

(56) References Cited

U.S. PATENT DOCUMENTS

| | | | | |
|---|---|---|---|---|
| 4,773,001 A | * | 9/1988 | Blair et al. | 340/825.52 |
| 5,590,369 A | * | 12/1996 | Burgess et al. | 710/110 |
| 5,959,988 A | * | 9/1999 | Bjorkman et al. | 370/389 |
| 6,272,339 B1 | * | 8/2001 | Wiedeman | 455/426.1 |
| 6,735,184 B1 | * | 5/2004 | Davidson et al. | 370/316 |
| 6,850,497 B1 | * | 2/2005 | Sigler et al. | 370/310 |
| 2002/0037733 A1 | * | 3/2002 | McKenna et al. | 455/517 |

* cited by examiner

*Primary Examiner*—Edward F. Urban
*Assistant Examiner*—Tu X. Nguyen

(57) ABSTRACT

A cellular telephone network comprises peripheral branches and a central high-capacity data trunking region or network backbone. The invention concerns effective utilization of trunking capacity to provide backbone facilities for such a network. The network backbone comprises a satellite interface for a satellite connection and alternatively or additionally a backup backbone route. For example an Internet backbone route and a satellite backbone route may be used, one backing up the other.

12 Claims, 12 Drawing Sheets

INFRASTRUCTURE FOR TELEPHONY NETWORK

FIELD OF THE INVENTION

The present invention relates to infrastructure for a telephony network and more particularly but not exclusively to infrastructure including backbone and peripheral infrastructure for a cellular telephony network.

BACKGROUND OF THE INVENTION

Cellular networks generally comprise a series of base stations arranged to allow mobile stations within range of the network to contact other mobile stations and be able to access the public switched telephone network (PSTN). The base stations maintain wireless communication links with nearby mobile stations, but generally require hard infrastructure in the form of wiring to link the base stations to other parts of the cellular network and to outside networks and backbone networks. The laying of cable to provide such infrastructure is expensive and becomes more expensive if the infrastructure is to include any kind of backup provision. The cost of wired infrastructure is one of the limiting factors in extending a cellular network to remote areas.

The telephony system including cellular networks and the PSTN, is generally based on the E1, or possibly T1, protocol for multiplexing transmissions into time slots. The protocol is strongly synchronous in that the individual transmission to which a time slot is assumed to belong to is determined from its temporal position amongst the other time slots. Thus an individual transmission which does not have current data creates blank slots to reserve its current position.

Much available data carrying capacity is based on the TCP/IP protocol, which involves individual data packets being sent out over a network in accordance with destination information contained in a packet header. A single transmission is thus broken down into numerous packets which are each sent out independently over the network. The packets may be sent along different routes depending on availability and may not arrive in the order in which they have been sent. However the packet headers may be used by the receiving application to rebuild an original sequence from the packets.

The E1 (and T1) protocol thus depends on the preservation of a temporal relationship between time slots whereas the TCP/IP protocol does not preserve timing information. Thus TCP/IP based capacity cannot be used to transport E1 data since synchronization is not preserved, rendering the E1 datastream irrecoverable.

SUMMARY OF THE INVENTION

It is an aim of the present embodiments to solve the above mentioned problems and to provide a system in which the incompatibility between TCP/IP and E1 is overcome.

It is a further aim of the present embodiments to provide IP based infrastructure and infrastructure backup for cellular telephony networks.

It is a further aim of the present embodiments to provide IP based backbone infrastructure and infrastructure backup for cellular telephony based networks.

According to a first aspect of the present invention there is thus provided a cellular telephone network comprising peripheral branches and a central high-capacity data trunking region and using a synchronous data communication protocol and wherein the high-capacity data trunking region comprises a satellite interface for a satellite connection using a non-synchronous data communication protocol.

Preferably, the high capacity trunking region comprises a terrestrial high capacity trunking connection in parallel with the satellite connection such that the satellite connection is usable to back up the terrestrial connection.

Preferably, the synchronous data communication protocol is the E1 data protocol and the asynchronous data communication protocol is the TCP/IP data communication protocol, and wherein the satellite interface comprises an E1-TCP/IP converter.

Preferably, the high capacity trunking region comprises a terrestrial high capacity trunking connection in parallel with the satellite connection such that the terrestrial high capacity trunking connection is usable to back up the satellite connection.

Preferably, the synchronous data communication protocol is the E1 protocol and the asynchronous data communication protocol is the TCP/IP protocol and wherein the interface comprises E1-TCP/IP converters.

Preferably, the E1-TCP/IP converter comprises a multiplexer for converting between the E1 signal and the TCP/IP signal.

Preferably, the satellite link is via geostationary orbit satellite.

Preferably, the E1-TCP/IP converter comprises a multiplexer for converting between the E1 signal and the TCP/IP signal.

Preferably, the converter is operable to receive E1 signaling containing SS7 control signaling distributed therein at a predetermined data rate, the converter comprising
  an extractor for extracting the SS7 signaling, and
  a TCP/IP packet former for arranging the extracted signaling into TCP/IP packets.

Preferably, the converter comprises an encoder for encoding synchronization control data describing the E1 signal into headers of TCP/IP packets, thereby to enable subsequent synchronous reconstruction of the E1 signal.

Preferably, at least one of the peripheral branches comprises a satellite link and an E1-TCP/IP interface.

According to a second aspect of the present invention there is provided a branch of a cellular telephone network based on a first synchronous data communication protocol, comprising interfaces to a satellite link using a second, asynchronous, data communication protocol, wherein the interfaces comprise converters for converting data between the first data communication protocol and the second data communication protocol.

Preferably, the interfaces are arranged to provide the satellite link as a parallel path to a terrestrial data link.

Preferably, the interfaces comprise encoders for encoding synchronization control information of the first protocol when encoding data of the first protocol into the second protocol, thereby to enable reconstruction of a signal in the first protocol from data in the second protocol, which reconstructed data retains the synchronization.

Preferably, the system comprises at least one base station connected to at least one mobile switching center, the at least one mobile switching center being associated with at least one location register, and wherein the satellite link is arranged to connect the at least one mobile switching center with the at least one location register.

Preferably, the interfaces comprise decoders operable to decode synchronization control information from data arriving from the link, to reconstruct a synchronized telephony protocol data stream.

Preferably, the interface further comprises a buffer controllable according to the decoded synchronization information to recreate time delay relationships of the telephony protocol data stream.

Preferably, the telephony protocol allows non-data carrying time slots, and the interfaces comprising a non-data carrying time slot remover for removing the non-data carrying time slots during conversion into the asynchronous protocol and a time slot regenerator for regenerating non-data carrying time slots during reconstruction of the telephony protocol datastream.

According to a third aspect of the present invention there is provided a hub for connecting to a satellite link, the hub being associated with an interface for interfacing between a synchronous telephone data protocol and an asynchronous satellite data protocol, thereby to allow telephone data to be sent via the satellite link.

Preferably, the interface comprises a multiplexer for converting between the telephone data protocol and the satellite data protocol, and an encoder for encoding timing information of the telephone data protocol.

The hub is preferably operable to send the data via geostationary satellites.

According to a further aspect of the present invention, there is provided an interface for interfacing between an E1 data network and a TCP/IP data network, the interface comprising a multiplexer for converting between E1 and TCP/IP data formats and comprising an encoder for encoding timing information of the E1 format when encoding E1 data into TCP/IP data and a buffer for recreating E1 synchronization when converting the data back into E1 data.

According to a yet further aspect of the present invention there is provided a method of managing an E1-based telephone network using a combination of E1 and TCP/IP high speed data links each having a given capacity, the method comprising:

routing data directly via the E1 data links until their capacity is filled, converting excess data to TCP/IP format and routing via TCP/IP high speed data links, and reconverting the excess data to E1 format at a destination end of the TCP/IP high speed data links.

Preferably, converting and reconverting are carried out by multiplexing the excess data.

Preferably, the TCP/IP high speed data links comprise satellite data links.

Preferably, the satellite data links utilize satellites in geostationary orbit.

According to a further aspect of the present invention there is provided a communication backbone comprising high capacity E1 links and high capacity TCP/IP links and E1-TCP/IP converters therebetween.

Preferably, the high capacity TCP/IP data links comprise satellite links.

According to a yet further aspect of the present invention, there is provided the use of synchronization preserving E1-TCP/IP protocol conversion to allow interconnection of geostationary satellite links and Internet backbone links with mobile telephone networks to form a unified network.

According to a yet further aspect of the present invention there is provided a series of TCP/IP data packets each having a packet header comprising timing information to allow reconstruction of the series as an E1 stream, the packets each carrying SS#7 data payload.

According to yet another aspect of the present invention there is provided an E1-TCP/IP data converter comprising a packager operable to package the E1 data as a series of independent packets and an encoder operable to insert within each one of the independent packets, header information indicating synchronization information of the packet as part of the E1 data.

Preferably, the packager comprises a filter for identifying and discarding empty E1 time slots.

Preferably, the filter further comprises a filter encoder for encoding positions of the discarded slots.

Preferably, the filter is operable to discard predetermined time slots.

According to a further aspect of the present invention there is provided a TCP/IP-E1 data reconverter comprising an input buffer for receiving TCP/IP packaged E1 data as a series of unsynchronized TCP/IP packets, a header reader for reading E1 synchronization data from the packets, and a reconstructor for using the E1 synchronization data to provide a reconstruction of an original E1 data stream from the TCP/IP data packets.

Preferably, the E1 synchronization data comprises information of discarded timeslots and wherein the reconstructor is operable to regenerate the discarded timeslots for insertion into the reconstructed E1 data stream.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
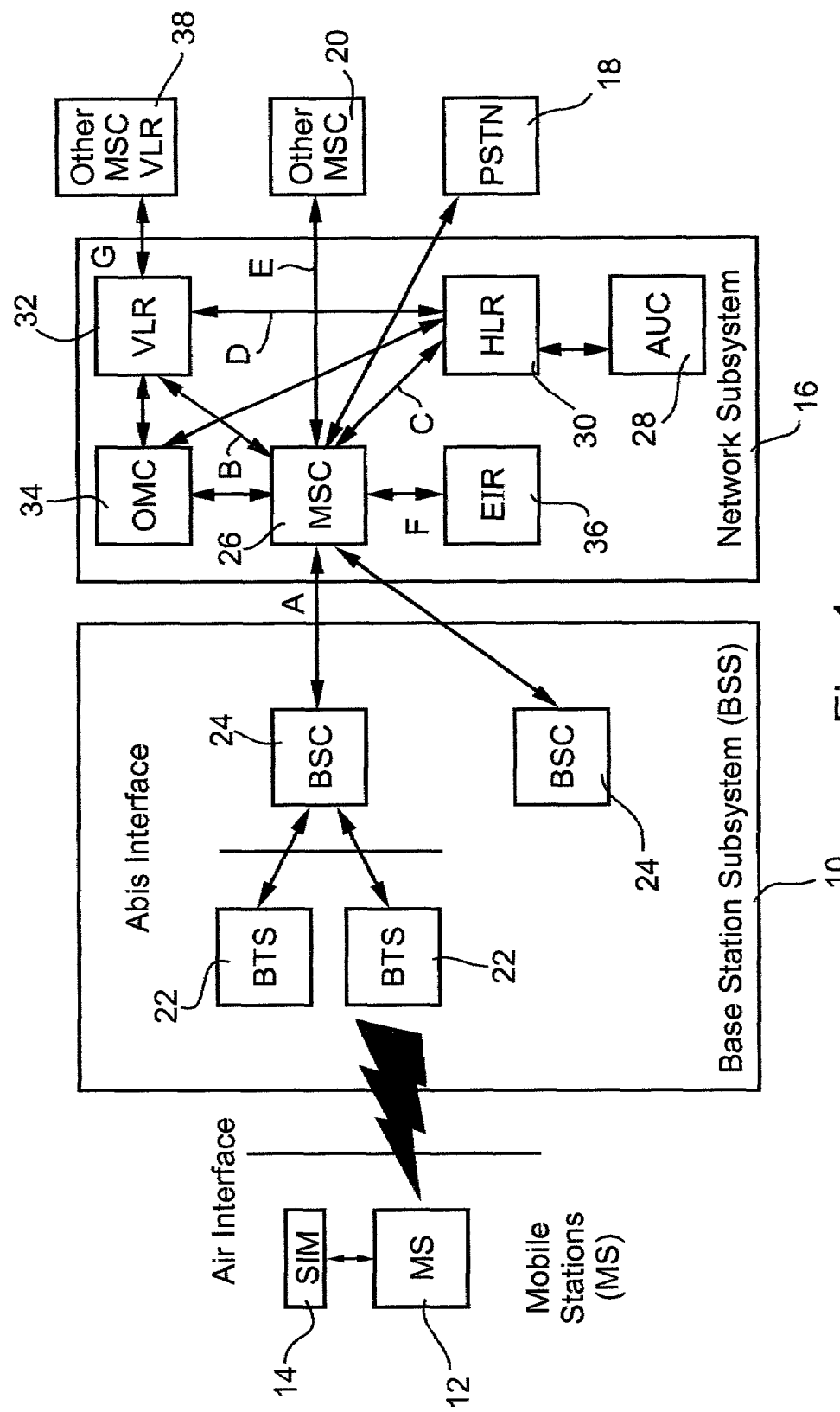
FIG. 1 is a generalized block diagram showing part of a standard GSM-based mobile telephony system including a base station subsystem and a network subsystem.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The embodiments concern cellular and other wireless networks comprising branches and a heavy data trunking region which is required to carry large amounts of data rapidly and thus to serve as the backbone of the network. Generally, telephony based systems use the E1/T1 telephony protocols whereas data carrying capacity that uses the TCP/IP Internet protocol is readily available. Such data capacity is available in the form of satellite capacity, particularly via geostationary satellite, and by terrestrial IP resources. The embodiments describe how these IP resources may be incorporated into telephony networks as cellular infrastructure, as high capacity backbone or as a backup to either the infrastructure or the backbone of a telephony network. The embodiments also show and describe interface devices and methods.

Reference is now made to FIG. 1, which is a generalized block diagram of a standard mobile telephone system. In FIG. 1, a user (not shown) connects to a base station subsystem 10 (BSS) via a mobile station (MS) 12 over an air interface. The mobile station 12 comprises a subscriber identity module (SIM) 14 that allows the mobile station 12 to be identified to the system, both so that calls can be routed to it and so that it can be billed. The base station subsystem is connected to a network subsystem 16 which provides a link to the outside world of the regular telephone network 18 (PSTN) and other parts of the mobile phone network (other MSC) 20.

Referring to the base station subsystem 10 in more detail, it comprises a base transceiver station (BTS) 22, which supports two way communication with the mobile stations 12, and base station controllers (BSC) 24 which control the transceivers 22 and route data between the transceivers and the network subsystem.

Referring now to the network subsystem 16 in more detail, it comprises a mobile switching center 26 (MSC) through which data is routed and which controls tracking of mobile stations so that the mobile station is correctly identified, so that data is routed to the correct base station and so that handover between base stations is carried out correctly during movement of the mobile station over the course of a call. The MSC 26 is the central component of the network subsystem 16, and performs the switching functions of the network. It also supports connections (18, 20, 38) to other networks.

In order to carry out the above-mentioned tasks the mobile switching center is supported by an authentication center (AUC) 28 for authenticating identifications made of mobile stations, for example using digital signatures. A home location register 30 (HLR) and a visitor location register 32 (VLR) comprise lists of mobile stations so that identification of the mobile station can be carried out, and an operations and maintenance center 34 allows for overall supervision of the system.

More particularly the HLR 30 is a dynamically defined database that stores information of the subscribers within the coverage area of an MSC. It stores the current location of the subscribers and the services to which they have access. The location of the subscriber corresponds to the SS7 address of the Visitor Location Register (VLR) 32.

The VLR 32 is used for subscribers away from their home part of the cellular network. The VLR 32 contains information taken from a subscriber's own local HLR in order to provide the subscribed services to visiting users in the current mobile region. When a subscriber enters the covering area of a new MSC, the VLR associated with the new MSC requests information about the new subscriber from his HLR. The VLR preferably obtains enough information to provide the subscriber with the appropriate services without needing to ask the source HLR each time a communication is established.

The VLR is generally implemented together with an MSC; so that the area under control of the MSC is identical with the area under control of the VLR.

Equipment identity register (EIR) 36 is connected to the MSC 26. The EIR is a register containing information about individual mobile units. More particularly, it contains a list of all valid terminals. A terminal is identified by its International Mobile Equipment Identity (IMEI). The EIR uses the number and the register to forbid calls from stolen or unauthorized terminals, unauthorized including for example a terminal that does not respect the specifications concerning the output RF power).

The visitor location register 32 is operatively associated with other visitor location registers 38, thereby to assist in managing handover and like procedures. In the following, the network subsystem and the base station subsystem and the connections within and therebetween are referred to as the cellular infrastructure. High capacity connections that link different MSCs or groupings of MSCs are referred to as the cellular backbone. High capacity connections that form part of the PSTN 18 are referred to as the PSTN backbone.

In general, both the cellular and PSTN systems use telephony protocols such as E1. Additional network capacity is available in the form of communication links that use the TCP/IP Internet protocol, such as much of the geostationary satellite based links and Internet structure, but this capacity is not available for telephony due to incompatibility between the different protocols, as explained in the introduction.

Figure 2:
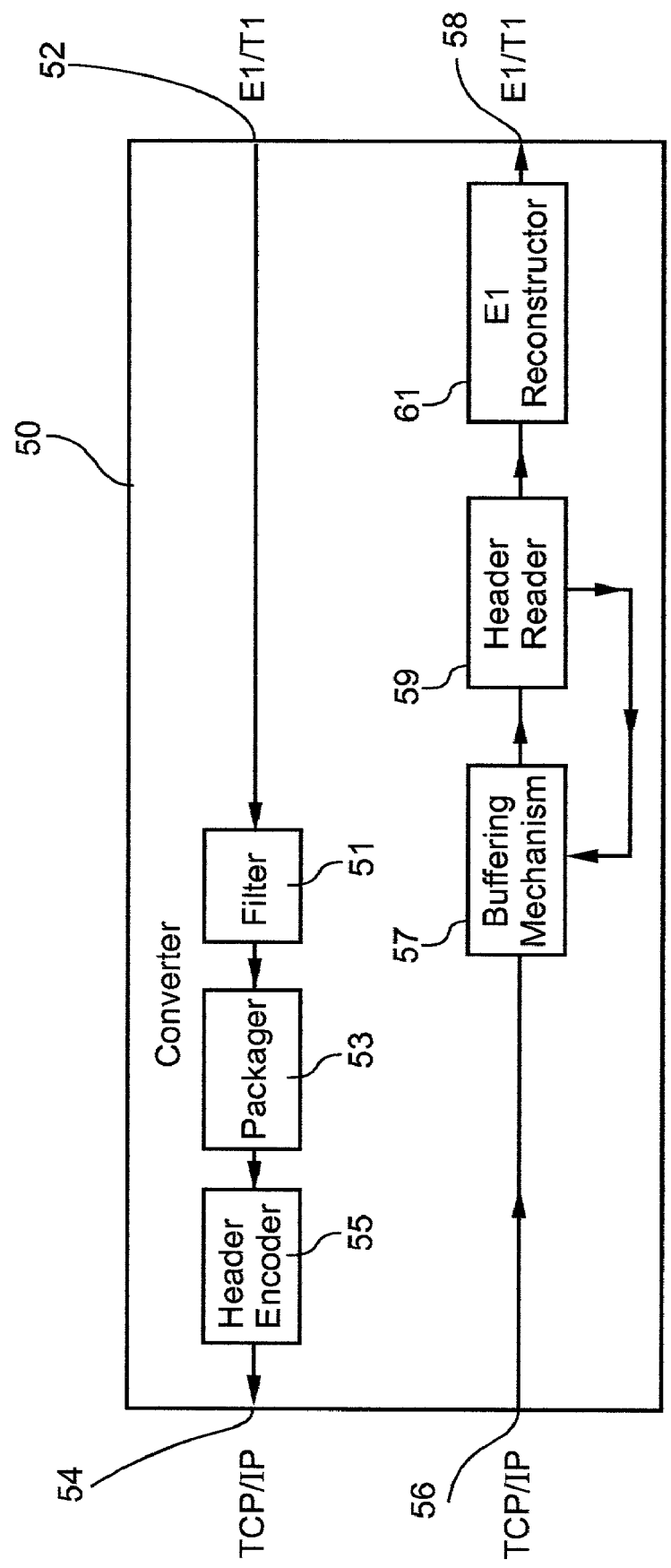
FIG. 2 is a simplified block diagram of a converter or an IP multiplexer (IPMux), which is able to convert between synchronous and asynchronous protocols, in particular between E1/T1 and TCP/IP.

Reference is now made to FIG. 2, which is a simplified diagram of an interfacing device comprising an internet protocol multiplexer (IPMux) for use in a first embodiment of the present invention. The IPMux 50 comprises a first input port 52 for receiving an E1 or T1 data stream. The E1 or T1 data stream is generally a highly synchronized or ordered data stream comprising numerous communication channels (transmissions) multiplexed together in different time slots within a continuous stream. The time slots comprise both data and associated control signaling. The multiplexer packages the data stream and associated control signaling into TCP/IP data packets as data payload such the packaging can be removed at the far end to leave the original E1 or T1 data stream in its entirety. The TCP/IP data packets are first stripped of blank time slots, T0 slots and other user predetermined parts of the E1 signal, by a filter 51. The filtered data is then packaged into IP data packets of a predetermined size by packager 53 and then a header encoder 55 encodes synchronization or ordering information of the E1 data stream so that the original stream can be reconstructed at a receiving end. The newly packaged data is delivered to a TCP/IP data port 54 for output to a network based on TCP/IP.

The multiplexer 50 also carries out the reverse operation on TCP/IP data packets supplied to an input port 56. The original order of the incoming TCP/IP packets has generally been lost over the TCP/IP link, since the TCP/IP protocol does not provide any packet order delivery feature. The disordered packets are entered into a buffering mechanism 57 which is connected to a header reader 59. The header reader 59 reads the synchronization or ordering information that has been encoded in the packet headers and operates the buffering mechanism to reproduce the original timing information of the E1 signal. As the packets emerge from the buffering mechanism, the TCP/IP packaging is stripped off and the original ordered E1 stream is reconstructed by E1 reconstructor 61, again using the synchronization or ordering information obtained from the headers. The reconstructed stream is then sent to output port 58 to be passed on to any telephony network.

As mentioned above, the sequential order of the data packets is preferably encoded into packet headers at the sending end and the IPMux 50 is able to recreate the temporal order of the data when recreating the E1 stream. Buffering allows exact time difference sequences to be reconstructed. The IPMux 50, using data encoded into the packet headers, is also able to recreate blank slots, which have no meaning within a TCP/IP environment but are necessary in the E1 environment for maintaining correct sequence between time slots. Suitable buffering and reconstruction thus allows an E1 stream at the output which is a reconstruction of the E1 stream at the input despite having used an asynchronous protocol in between. Thus the IPMux 50 provides transparent bridging between E1//T1 based systems and switch based packet networks including but not restricted to TCP/IP based networks.

The IPMux 50 is preferably configurable to set desired packet sizes, and the filter 51 is preferably configurable to filter out E1 time slots that do not carry data. A definition for a non-data carrying time slot is preferably provided to filter 51 by an operator prior to use. Preferably, TS0 slots of the E1 protocol are also filtered out since these have no meaning in the TCP/IP protocol and may in any case be regenerated at the receiving end.

Figure 3:
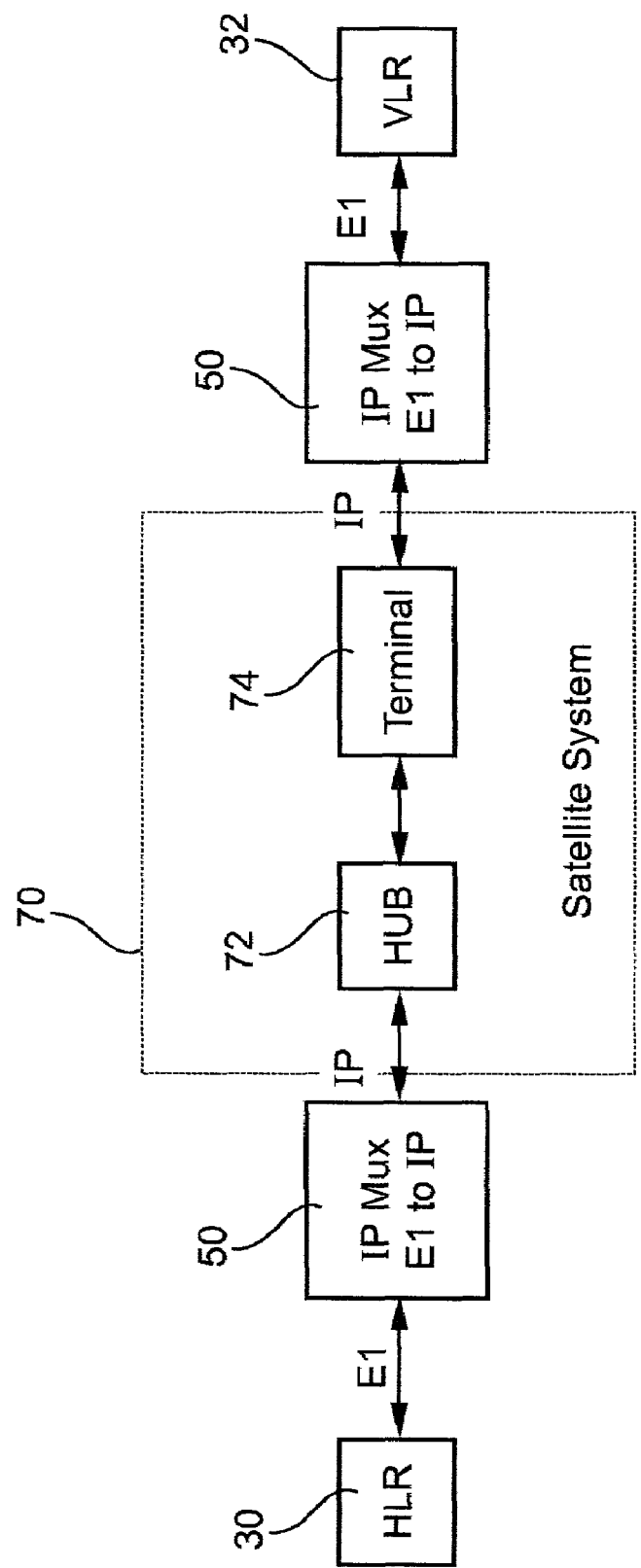
FIG. 3 is a simplified block diagram showing a satellite connection in use as part of the infrastructure of a cellular network.

Reference is now made to FIG. 3, which is a simplified block diagram of an embodiment of the present invention in which the IPMux of FIG. 2 is used as a bridging mechanism to allow use of a TCP/IP-based satellite link to form part of the infrastructure of a cellular network. Parts that are identical to those shown above are given the same reference numerals and are not referred to again except as necessary for an understanding of the present embodiment. More specifically, IPMux's 50 are used to connect HLR 30 to VLR 32 via a satellite system 70. The satellite system 70 uses the TCP/IP protocol and comprises a hub 72 at one end of the link and a terminal 74 at the other end of the link, communication between the hub and the terminal being via one or more satellites in geostationary orbit. E1 data from either the HLR or the VLR is packaged in a first one of the IPMux's 50 into TCP/IP data and then sent as standard IP data over the satellite system to the other one of the IPMux's 50 where the TCP/IP packaging is removed and the original, synchronized, E1 format is restored, preferably entirely transparently to the E1 network system.

Figure 4:
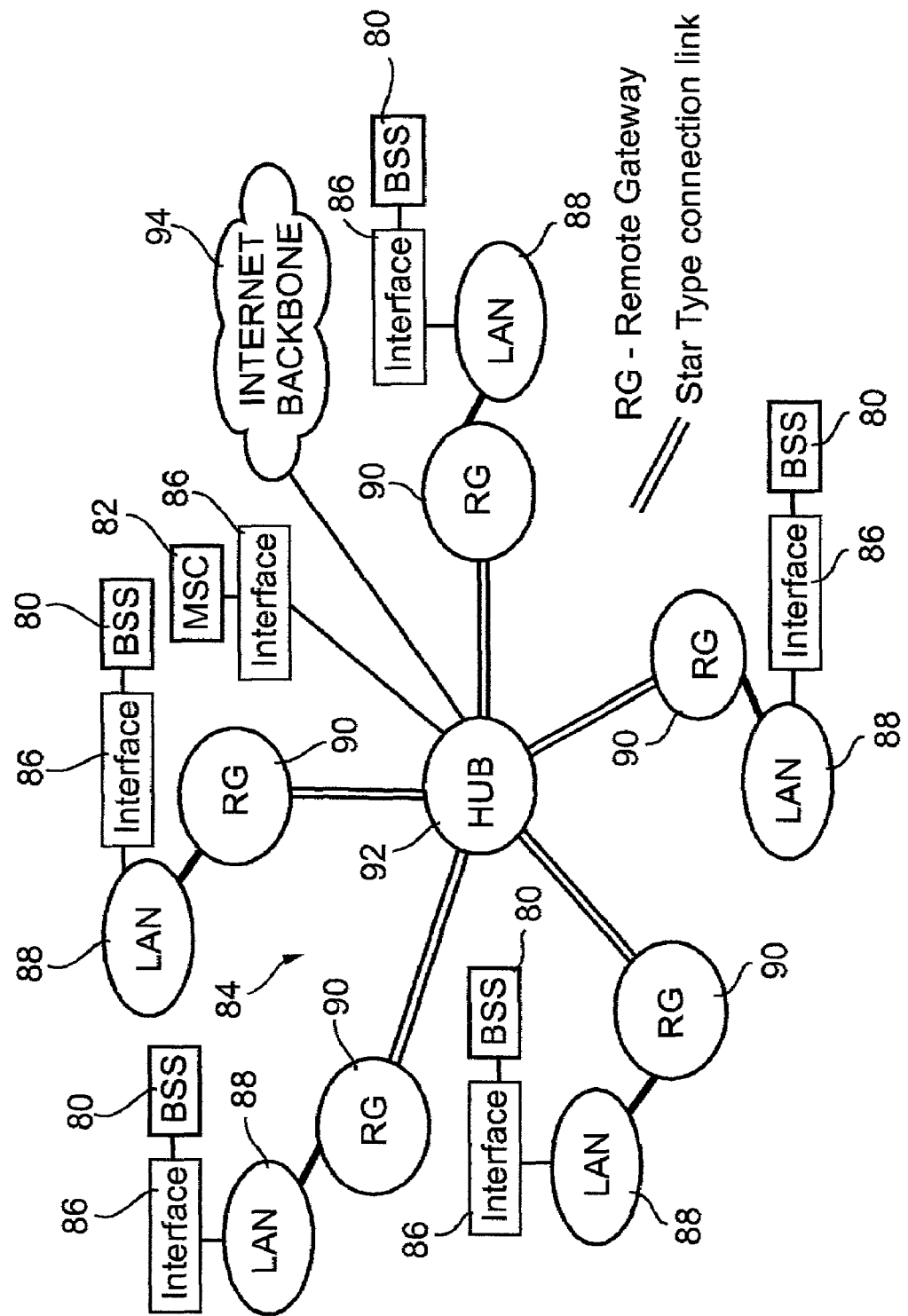
FIG. 4 is a simplified block diagram of a star connected satellite-based network linking parts of a cellular network.

Reference is now made to FIG. 4, which is a simplified diagram showing how a combined satellite and LAN system may be used to provide or contribute to a cellular infrastructure. In FIG. 4, a series of base station subsystems (BSS's) 80 are connected to a mobile switching center (MSC) 82. Each of the BSS's 80 and the MSC 82 use the E1 (or T1) telephony protocols and are connected to the combined Satellite and Internet LAN system 84, which is TCP/IP based, via interfaces 86. The Interfaces 86 preferably comprise IPMux's 50 of the kind described with respect to FIG. 2. Each of the interfaces 86 is preferably connected to a LAN 88, which is in turn connected to a remote gateway 90. It is added that an alternative name for such a remote gateway is SIT satellite interactive terminal. VSAT is another term, particularly referring to relatively small antennas.

Generally speaking, a remote gateway is a means for providing a connection for user equipment to a hub. It is noted that the MSC 82 is connected via its interface directly to the hub 92 rather than via a LAN and a remote gateway. The remote gateway 90 is nevertheless used to connect LANs to Internet infrastructure. The remote gateways 90 are star-connected to the hub 92 via one or more satellites. The hub may be directly connected to backbone data links, for example the Internet backbone 94, which itself may partly consist of satellite links.

Thus, using interfaces such as IPMux's 50, it is possible to provide an IP network involving LANs and satellite hubs to provide cellular infrastructure.

Figure 5:
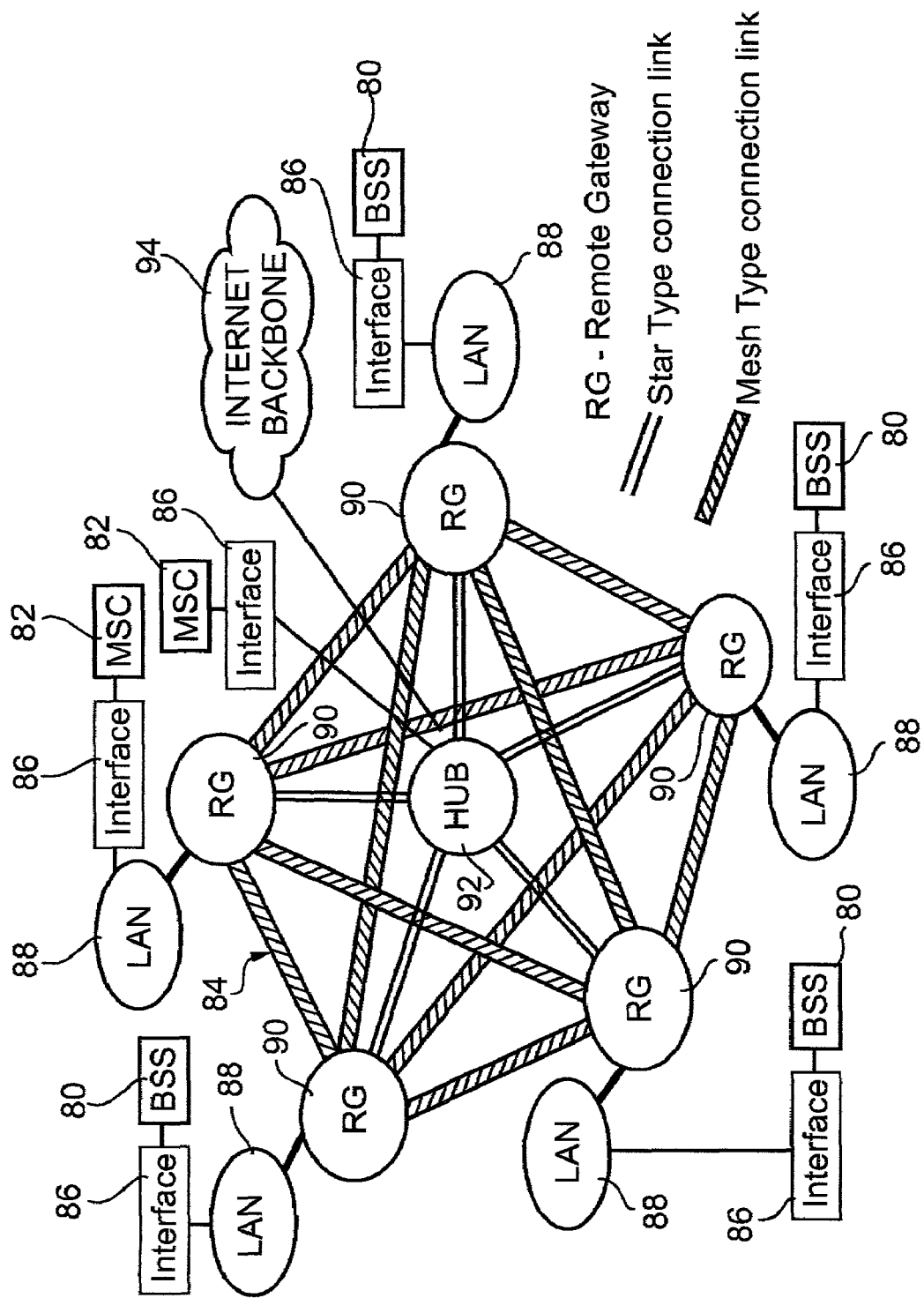
FIG. 5 is a simplified block diagram of a star connected satellite based network as in FIG. 4 but with additional mesh connections between remote gateways.

Reference is now made to FIG. 5, which shows an alternative configuration of the combined satellite and Internet LAN system of FIG. 4. Parts that are identical to those shown above are given the same reference numerals and are not referred to again except as necessary for an understanding of the present embodiment. In the embodiment of FIG. 5, in addition to star type connections via the hub 92 there are also provided mesh type connections providing direct linking between adjacent remote gateways 90. It is pointed out that the mesh type connections are preferably satellite-based connections.

In FIG. 5, two MSC's 82 are shown, one of which is connected directly to the hub 92, as with the embodiment of FIG. 4, and a second is connected via a LAN 84 and a remote gateway 88. It will be appreciated that only the latter MSC is able to benefit directly from communication via the mesh type connections.

Figure 6:
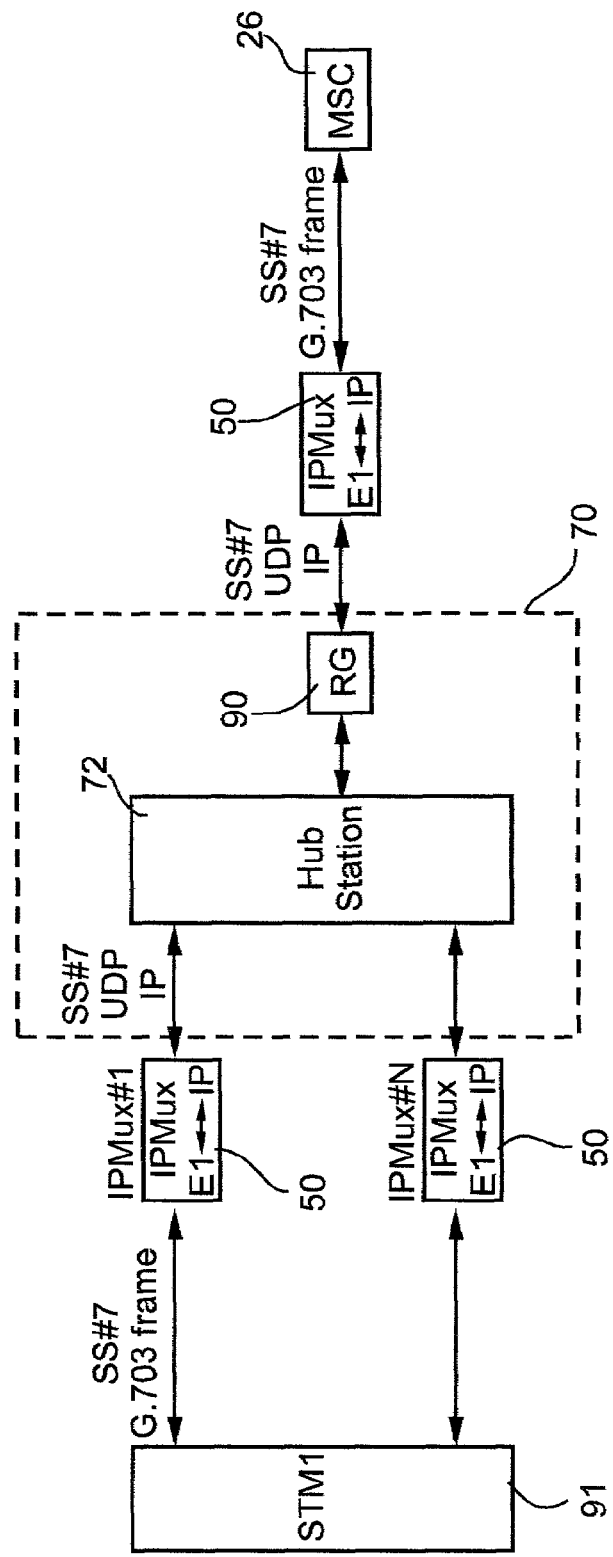
FIG. 6 is a simplified block diagram of a satellite link comprising a hub and the remote gateway of FIG. 5 providing an infrastructure link within a cellular network, in accordance with one embodiment of the present invention.

Reference is now made to FIG. 6, which is a simplified block diagram showing a satellite connection built in to a cellular telephone infrastructure, according to one preferred embodiment of the present invention. Parts that are identical to those shown above are given the same reference numerals and are not referred to again except as necessary for an understanding of the present embodiment. A satellite link 110 connects a first IPMux 50 to a second IPMux 50. The link itself comprises a remote gateway 90 at one end and a hub station 72 at the other end. The link overall is star-connected, as discussed above in respect of FIG. 4 or comprises a combination of star and lateral connections as described above with respect to FIG. 5. In either case the hub station 72 is preferably the center of a network linking numerous remote gateways 90 and thereby MSCs 26. The hub is a point at which data concentration naturally occurs and it is therefore a suitable point for allowing for connectivity to backbone networks.

In FIG. 6, data is transported over the telephony part of the network as E1 data in SS#7 format. The IPMux's 50 serve to package the SS#7 format data in IP packaging for passage through the satellite link. It may then be repackaged into E1 for sending on to STM1 92.

Figure 7:
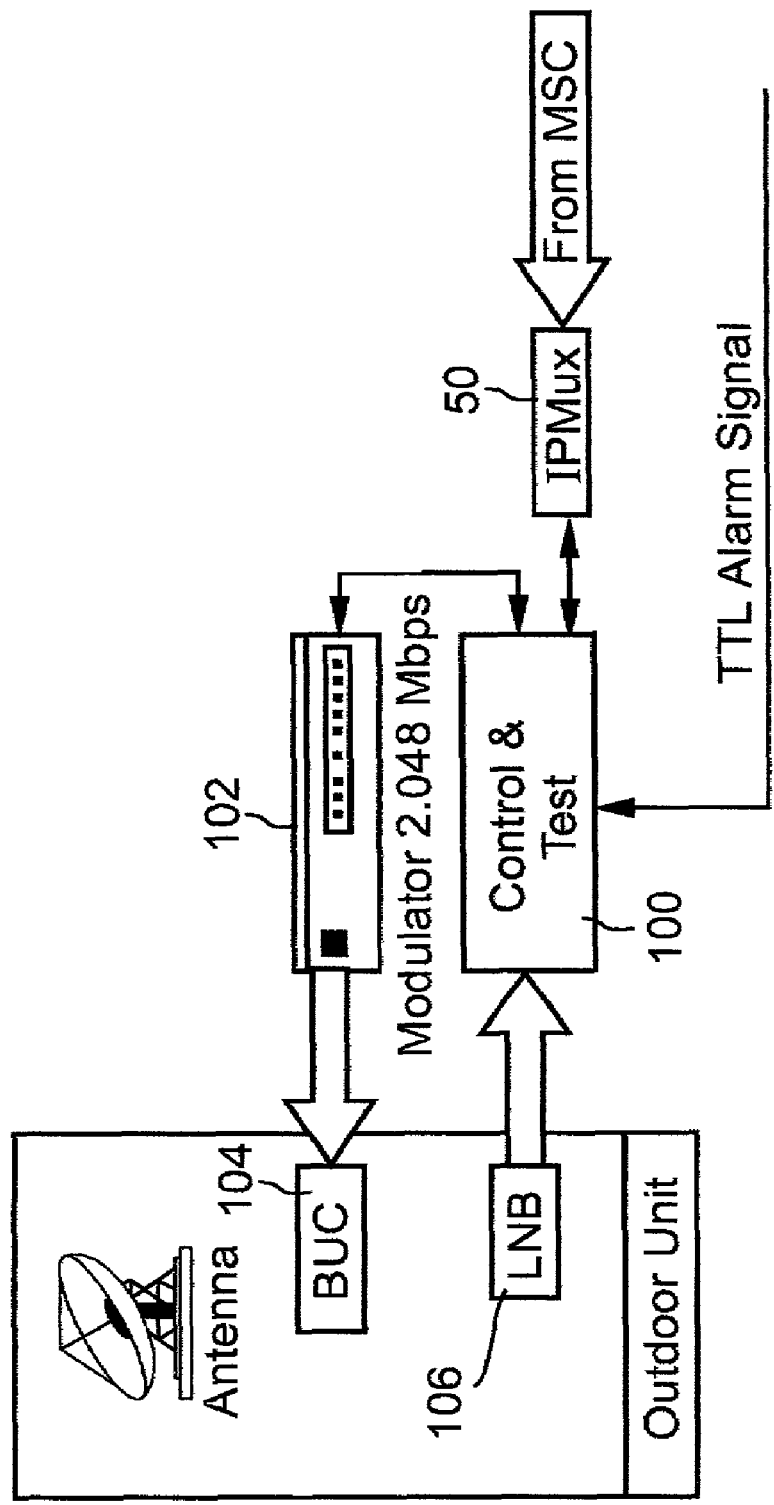
FIG. 7 is a simplified block diagram of the remote gateway of FIG. 6 in greater detail, the remote gateway being operable to connect E1/T1 networks to a TCP/IP based satellite link.

Reference is now made to FIG. 7, which is a simplified block diagram of the satellite link station of FIG. 6 according to an embodiment of the present invention. Parts that are identical to those shown above are given the same reference numerals and are not referred to again except as necessary for an understanding of the present embodiment. An IPMux 50 receives a signal from an MSC, the signal being in an E1 (or T1) signal format. The signal is packaged by the IPMux into TCP/IP packets and routed to a control and test unit 100 and then to a modulator 102. The control and test unit determines whether and when to provide satellite bandwidth, arranges for transmission of data in accordance with the assigned bandwidth, and is responsible for correct data routing. The modulator 102 applies various modulation techniques to improve the data rate/bandwidth utilization level.

A preferred data rate for the embodiment of FIG. 7 is 2,048 MHz.

From the modulator 102 the signal is sent to a block up converter (BUC) 104. The BUC 104 preferably converts the signal to the Ku (or C) waveband and also amplifies the signal as necessary for transmitting via the satellite link. For data arriving from the satellite link there is provided a low noise block (LNB) 106. The LNB 106 carries out amplification of the received signal and converts it from the Ku (or C) waveband to the L waveband. The converted signal is then passed to the control and test unit 100 and from there to IPMux 50 from where it is preferably converted back into the original synchronized telephony format.

A TTL alarm signal is preferably provided to the control and test unit 100 for controlling the system with respect to on/off switching. Certain embodiments may always be on or may have other mechanisms for controlling the switching, in which case the presently described alarm arrangement is not required. When the satellite link is set up as a back up to a terrestrial link then the alarm line can be set upon failure of the terrestrial link to start operation of the satellite link. Upon restoration of the terrestrial link, the alarm line is preferably reset and use of the satellite link ceases.

Figure 8:
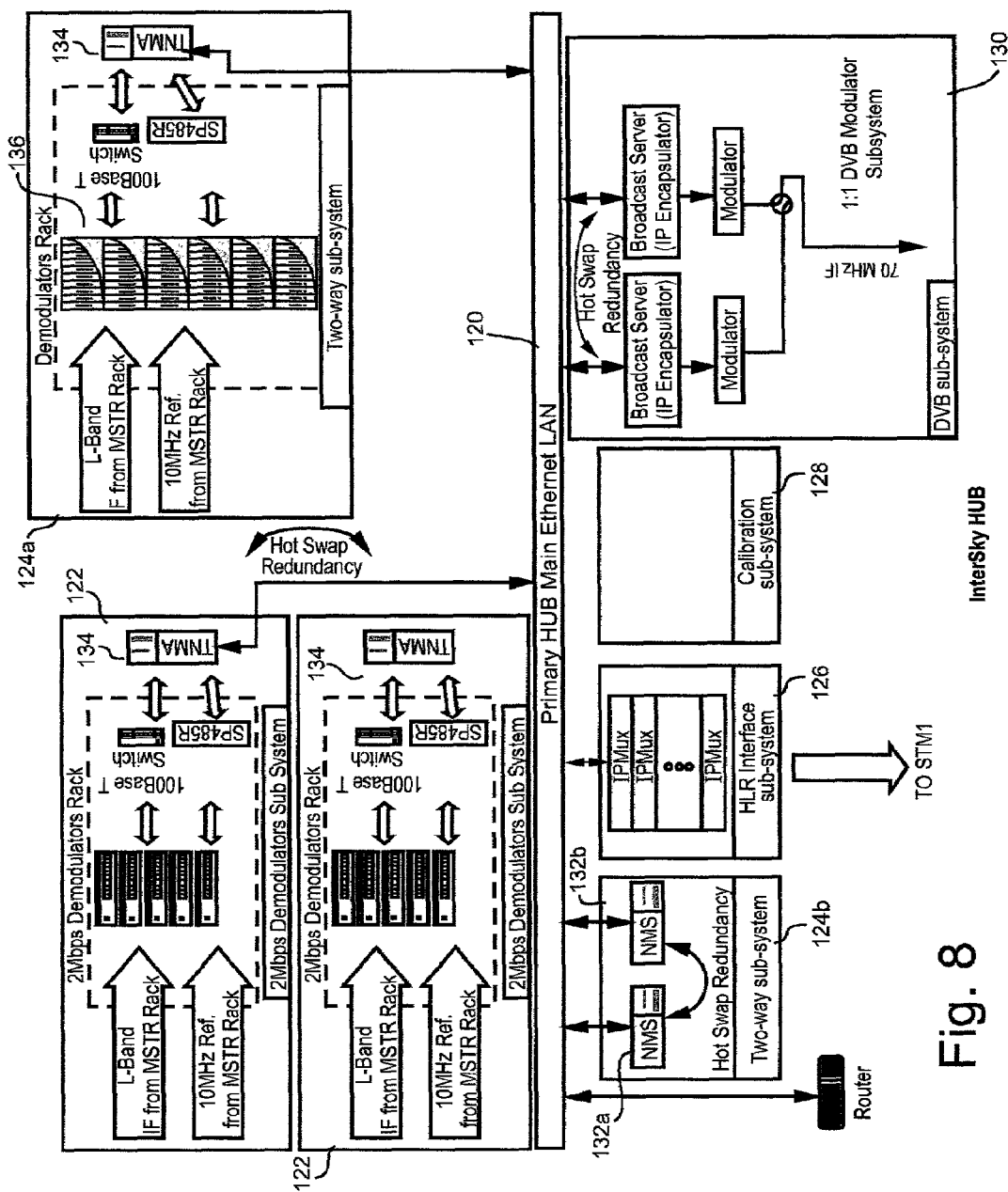
FIG. 8 is a simplified block diagram showing the hub station of FIG. 6 in greater detail.

Reference is now made to FIG. 8, which is a simplified block diagram of the hub station 72. Parts that are identical to those shown above are given the same reference numerals and are not referred to again except as necessary for an understanding of the present embodiment. The hub station preferably comprises a series of substations arranged around an Ethernet LAN 120 as follows:

1. A demodulator subsystem 122, optionally supplied in duplicate for back-up redundancy which supplies demodulation capacity to the two-way subsystem 124 described below;
2. A two-way subsystem 124a, 124b comprises two backup redundant network management systems (NMS)} servers 132a and 132b, a traffic network management agent (TNMA)} server 134 and a series of demodulators 136. Additional demodulation capacity is preferably available from the demodulator subsystem 122 as mentioned above. The demodulators are preferably of two types, one for demodulation of data traffic arriving from the remote gateways and one for demodulation of control signaling, which may also arrive from the remote gateways. The servers 132a, 132b and 134 preferably comprise a controller for controlling operation of return channels, and features for controlling the use of the link resources, for example bandwidth on demand facilities and automatic power control;
3. An HLR interface subsystem 126, which comprises a stack of IPMuxes 50 for packaging and unpackaging SS#7 E1 data into the IP protocol;
4. A calibration subsystem 128, which enables an operator to calibrate the link system and the remote gateways; and
5. A DVB subsystem 130. The DVB subsystem is responsible for the encapsulation of the IP data into a DVB-S stream, the stream providing messaging within the satellite system between the hub and the remote gateways Backup redundancy is preferably incorporated therein.

The hub station 72 preferably includes data receivers capable of processing data at high rates. Incoming data, in the form of IP packets, are forwarded to the LAN 120 from where they are passed to an IPMux 50 for unpacking back to E1 (or T1) format. Buffering is used to ensure that the unpacked E1/T1 data is carefully distributed over a set of time slots corresponding to the original set of time slots, as described above. Furthermore, empty time slots, which were not transmitted, are recreated.

Figure 9:
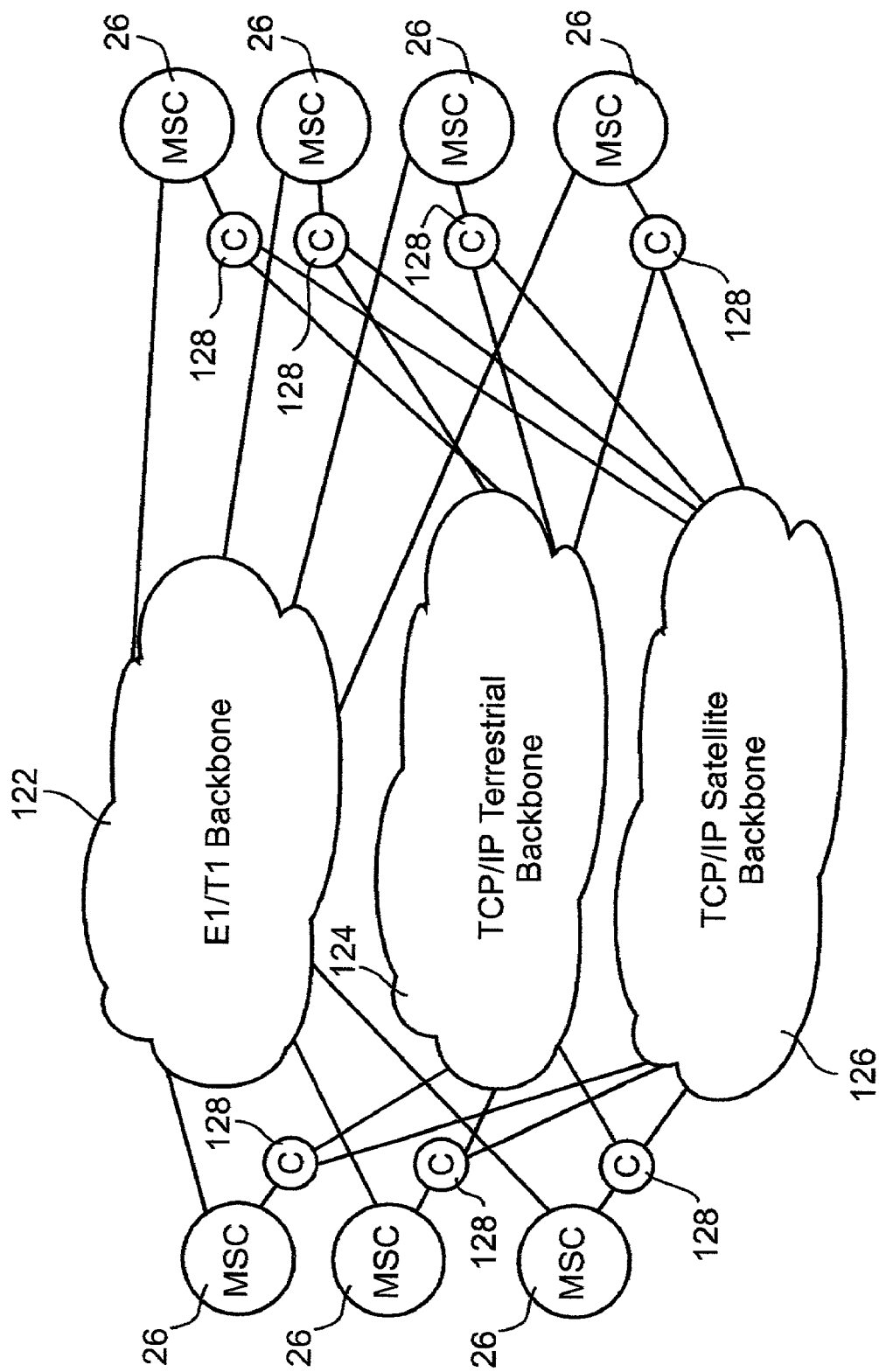
FIG. 9 is a simplified block diagram showing the use of satellite TCP/IP, terrestrial TCP/IP and E1/T1 backbone in parallel to link parts of a cellular network.

Reference is now made to FIG. 9, which is a simplified block diagram showing how telephony, terrestrial IP and satellite IP networks can serve as backups for one another. In FIG. 9, a series of MSCs 26 are connected together via three different backbone networks, an E1/T1 standard telephony backbone 122, a terrestrial TCP/IP link 124 and a satellite TCP/IP link 126. The MSCs are connected to each of the TCP/IP links via converters 128 but are directly connected via the E1/T1 links 122. In use, communications are preferably normally routed via the E1/T1 link 122. If the E1/T1 link fails or has no spare capacity, then data is routed through the TCP/IP terrestrial link 124. Should the terrestrial TCP/IP link 124 fail or run out of capacity then data is routed through the satellite link 126.

Figure 10:
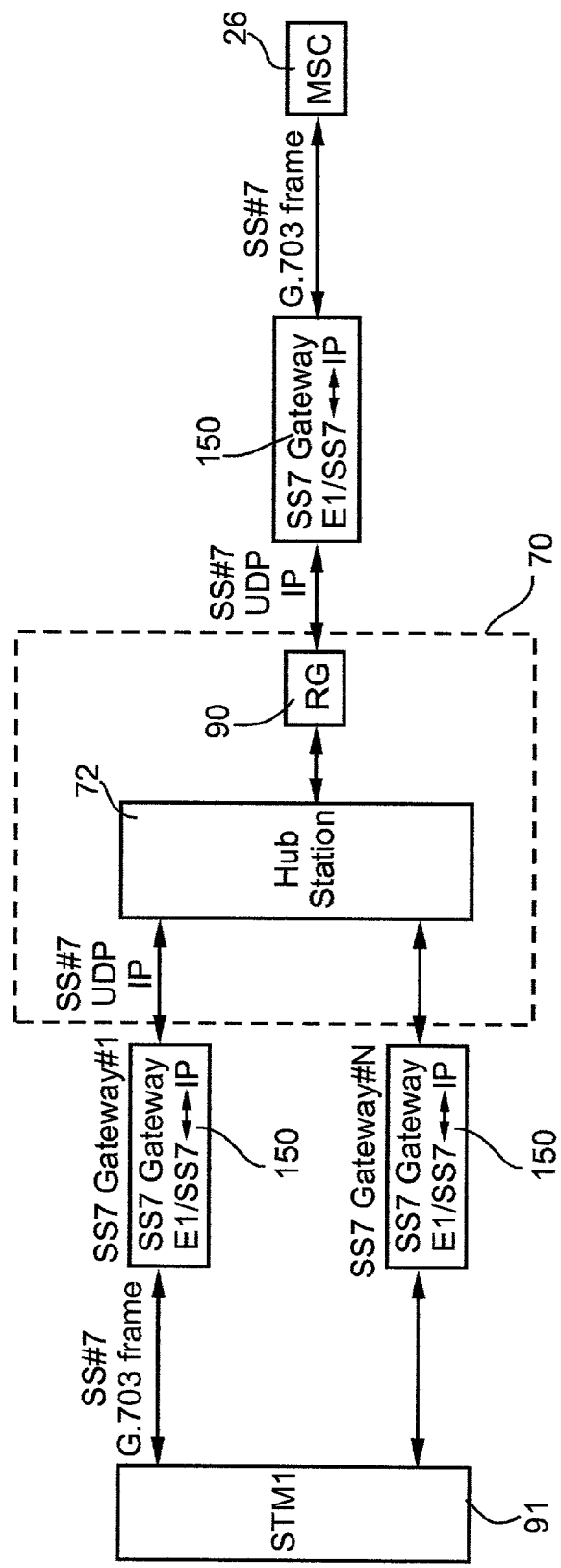
FIG. 10 is a simplified block diagram showing a communication channel bridging mobile and satellite components, and illustrating another preferred embodiment of the present invention.

Reference is now made to FIG. 10, which is a simplified block diagram showing a satellite connection station built in to a cellular telephone infrastructure, according to another preferred embodiment of the present invention. Parts that are identical to those shown above are given the same reference numerals and are not referred to again except as necessary for an understanding of the present embodiment. FIG. 10 is a variation of the embodiment of FIG. 6, differing in that each IPMux 50 is preferably replaced with an SS7 gateway 150. The SS7 gateway provides an interface between TCP/IP protocol packets and a hybrid protocol referred to herein as E1/SS7. In the hybrid protocol, E1 time slots, which are very high data rate slots, reserve small messages for SS7 signalling. The SS7 messages are recognizable and the gateway is able to extract the SS7 signalling for direct placement in IP packets to be sent over the satellite link at a data rate lower than the E1 rate.

The gateway thus passes through the entirety of each E1 time slot and removes the SS7 message only, the message size having been chosen to give a data rate which is compatible with the data rates supported by the satellite connection. Extensive buffering is therefore avoided. The gateway, by extracting only the SS7 signalling, thus obtains data at an effective overall data rate that is intrinsic to SS7 (for example 384 kbps), and thus the high speed modems (102, 122), which were added to the satellite links in the previous embodiments, may be dispensed with. The SS7 signaling is preferably transmitted as data over the satellite link.

The embodiment of FIG. 10 allows constant SS7 signalling and thus provides the possibility of a permanent virtual channel (PVC).

In more detail, at each remote site, an SS7 Gateway 150.1 is connected between the E1 port of an MSC 26 and the remote gateway unit 90. Each Remote Gateway 90 is preferably capable of transmitting a signal with data rate of for example 384 Kbps. The total number of time slots carrying SS7 data depends on the erlangs of the system. A rough estimate suggests that for a typical case, 16 time slots can be transmitted per Remote Gateway 90 although other numbers of time slots are also entirely conceivable.

At the Hub 72, one SS7 Gateway 150.2, 150.3 is used per E1 port. These units convert the data traffic from SS7 IP back to G.703 framing, namely back to the hybrid format.

Preferably, throughout the change in format, port mapping and time slot TS order are retained.

It thus follows that each E1 port is connected to at least one SS7 Gateway 150 and to a single Remote Gateway 90. Each SS7 Gateway 150 preferably converts a specific number of time slots (SS7 links) into IP data packets. Since all the packets reach a single Remote Gateway 90, priority may be assigned to the entire respective E1 port. Each SS7 link must be assigned a destination IP address, which destination IP address may then be used to map the data back into the appropriate time slot at the far end.

A specific embodiment preferably employs the standard InterSKY™ system, and such a specific embodiment may be provided without needing any modifications to the standard system other than providing a signal to activate the Remote Gateway 90, as discussed above in respect of FIG. 7. Once the SS7 Gateway 150 has converted the SS7 link into IP format, the transfer, over the satellite link, is the same as with any other IP data. Compatibility of the SS7 Gateway 150 with the GSM system insures the success of the connection.

Figure 11:
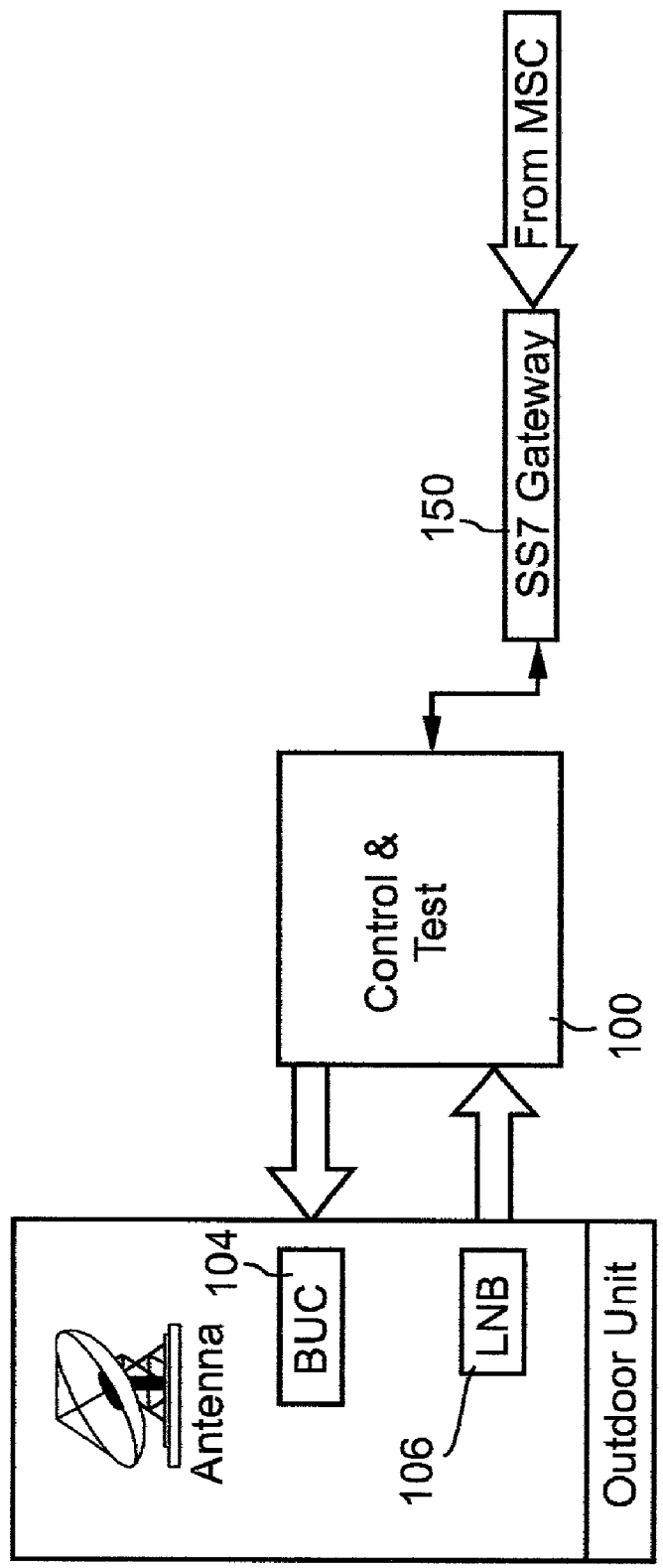
FIG. 11 is a simplified block diagram showing a remote gateway of a satellite link for use with the embodiment of FIG. 10.

Reference is now made to FIG. 11, which is a simplified block diagram of the satellite connection station of FIG. 10 according to an embodiment of the present invention. Parts that are identical to those shown above are given the same reference numerals and are not referred to again except as necessary for an understanding of the present embodiment. An SS7 gateway 150 receives a signal from an MSC 26, the signal being in the combined E1/SS7 signal format. The SS7 part of the signal is arranged as IP encapsulated SS7 packets and routed to a control and test unit 100, but the high speed modulator 102 of FIG. 7 is dispensed with. The control and test unit determines whether and when to provide satellite bandwidth, arranges for transmission of data in accordance with the assigned bandwidth, and is responsible for correct data routing.

The signal is sent to a block up converter (BUC) 104. The BUC 104 preferably converts the signal to the Ku waveband and also amplifies the signal as necessary for transmitting via the satellite link. For data arriving from the satellite link there is provided a low noise block (LNB) 106. The LNB 106 carries out amplification of the received signal and converts it from the Ku/C waveband to the L waveband. The converted signal is then passed to the control and test unit 100 and from there to other SS7 gateway units 150 from where it is preferably converted back into the combined E1/SS7 format.

Figure 12:
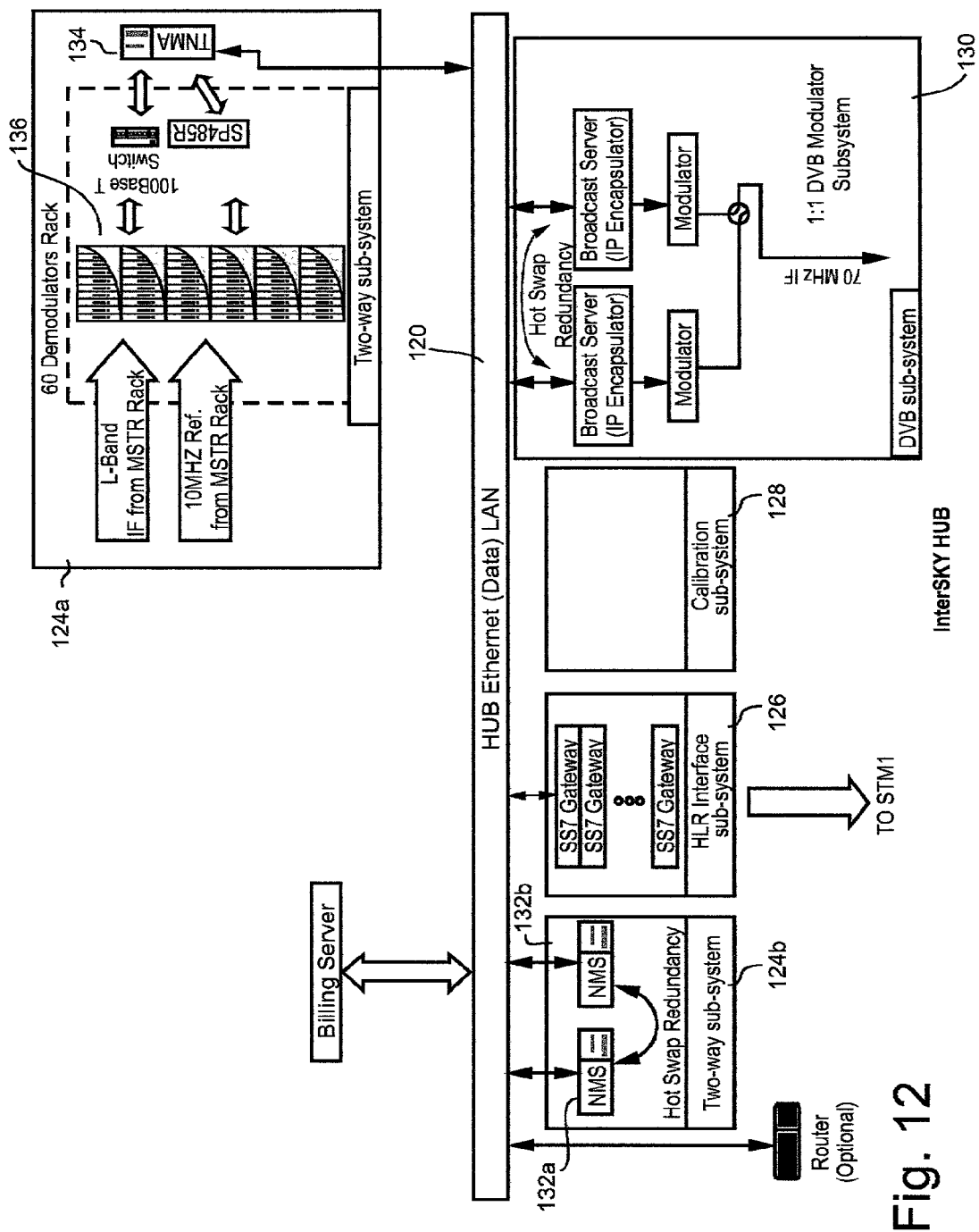
FIG. 12 is a simplified block diagram showing in greater detail the satellite hub of FIG. 10.

Reference is now made to FIG. 12, which is a simplified block diagram of the hub station 72, and corresponds to FIG. 8. Parts that are identical to those shown above are given the same reference numerals and are not referred to again except as necessary for an understanding of the present embodiment. The hub station preferably comprises a series of substations arranged around an Ethernet LAN 120 as previously. However the SS7 gateways are used to replace IPMuxes in the HLR interface subsystem 126.

The embodiment of FIGS. 10-12 preferably provides a means in which the satellite link can be used invisibly to provide a backup to a main backbone link. SS7 is composed of three types of messages:
 1. MSU—traffic messages
 2. LSSU—maintenance messages
 3. FISU—filler messages A GSM-MSC-SS7 link typically always contains one of the following combinations of messages, viz: MSU+FISU or LSSU+FISU. It is required of an SS7/IP Gateway that it filters out the FISU and regenerates it at the far end. The MSC 26 preferably has two outputs: an active (primary) terrestrial line with MSU messages and a secondary backup link with LSSU messages for connection to the satellite system 70. The LSSU messages preferably are able to use the above feature to create a private virtual channel (PVC).

One of the uses of the present system is as a primary link. In addition, the system may be used to provide a backup to the primary link as follows: When the primary link fails, the MSC 26 preferably ceases sending MSU messages over the primary link. It also stops sending LSSU messages on the backup link and sends MSU messages instead. The satellite system preferably uses the bandwidth-on-demand feature generally available for allocating bandwidth to automatically reconfigure the channel to accommodate the MSU traffic.

In the configuration described above the TTL activation signal described in respect of FIG. 7 is not required because the backup link is always active.

When the primary link is restored, the MSC preferably stops sending the MSU messages over the backup link and instead resumes the transmission of LSSU messages. The satellite system preferably uses the bandwidth-on-demand feature to automatically reconfigure the channel and reduce its size to transfer only the LSSU messages.

The Remote Gateway configuration is preferably a standard configuration. A typical standard configuration is the RG-384B known in the art. The E1 line from the telephony trunk is connected to the SS7 Gateway 150, as explained above, which gateway converts the signaling data into the IP protocol. The actual data rate of each SS7 link depends on the composite data rate of all time slots on that link. The bandwidth-on-Demand (BOD) feature of the satellite system may reduce the actual channel size below the maximum SS7 signaling rate, namely 64 KBPS.

The Hub station 72 may include receivers capable of receiving and processing received data. The received IP packets are forwarded to a LAN within the Hub. From the LAN the packets are routed to a corresponding SS7 Gateway 150.2, 150.3, as discussed above, which outputs the reconstructed original E1 signal, along with regenerated FISU messages, with the original time slots used. The signal is then applied to the appropriate ports.

In the opposite direction, the data from the HLR 30 is converted by the SS7 Gateway 150.2, 150.3 to IP packets and routed to an IP Encapsulator (IPE) unit. The IPE encapsulates the data to DVB-S format. The DVB format data signal is then broadcast to all the Remote Gateways 90. Each Remote Gateway 90 extracts only the information addressed to it. The extracted data is then delivered to the SS7 Gateway 150.1 and converted back to E1 format.

To summarize the transport protocols used, the data is preferably transported over the satellite using Internet protocol (IP). The signal outbound from the Hub is preferably DVB/S compatible and the return channel is preferably FDMA.

The order of the time slots of the E1 lines at the Hub 92 is preferably the same as the order of the E1 time slots at the GSM MSC 26.

A division of bandwidth may be made within the satellite link between the DVB-S outbound signal and the return channels. The DVB signal is preferably always operational. NMS control channel information may continuously be transmitted on the DVB channel. User data is preferably transmitted only when a Remote Gateway 90 is connected. The return channel section of the frequency segment is thus used only when a Remote Gateway is connected. Return channel bandwidth may also be used from time to time in order to connect the Remote Gateway 90 to for the purpose of performing a status check.

In a preferred embodiment, the PVC is used to send either LSSU or MSU information, such that the E1 port may always be connected. When LSSU messages are present a low data rate (small bandwidth) channel is preferably assigned. When MSU messages are present, on the other hand, a high data rate (larger bandwidth) channel may be assigned.

Bandwidth for the DVB and return channels may be assigned to different transponders on a single satellite. The bandwidth for the return channels can furthermore be reconfigured during system operation.

In general in satellite communication channels, only time slots carrying data are actually transmitted. As described above in respect of IPMux 50, ways of selecting such time slots may typically be pre-defined by the system operator. In particular, in the embodiment being described, only MSU or LSSU information need be transmitted. FISU messages, which do not have actual content, are preferably filtered and regenerated at the far side. The SS7 Gateway 150 preferably filters the TS0 part of the E1 signal. However, it generally transmits alarms carried in the TS0 part.

Corresponding regeneration of the filtered time slots is preferably carried out at the receiving end.

A preferred embodiment of the present invention includes a feature known as DAMA/BOD. DAMA/BOD allows the system to switch between a first channel size required for the PVC mentioned above and a second channel size required during active back-up operation. The term DAMA implies that each remote site is not assigned a specific frequency and that the specific operating frequency is selected from a pool in the available bandwidth spectrum. BOD, simply bandwidth on demand, means that the amount of bandwidth per remote site is altered according to the instantaneous needs of the specific site.

The system preferably uses the DAMA feature to assign channel and the BOD feature to automatically manage the bandwidth. A traffic analyzer or sniffer in the Remote Gateway 90 senses outbound IP traffic. If the Remote Gateway 90 is not currently connected when traffic is sensed, it initiates an automatic connection sequence. Thus, if the traffic analyzer or sniffer detects more outbound IP packets than the channel can handle, then it initiates a request for additional bandwidth (BOD).

Preferably, the system is both modular and expandable. A particular advantage of a preferred embodiment of the present invention is that control components at the Hub 92 can support additional remote sites and may also support non-SS7 IP traffic including Internet and intra-net data.

In a preferred embodiment of the present invention, each remote gateway 90 is equipped with a dial up modem. The dialup modem enables the operator to control the remote gateway 90 via the terrestrial lines in the event of a failure in the satellite link.

Considering the SS7 gateway in greater detail, In general the SS7 gateway operates in a similar manner to the IPMux 50 with the main difference being that instead of using multiplexing and buffering, the part of the E1 signal which is of interest is stripped out and used directly, which, as explained above, is possible because its distribution within the E1 signal is such as to give the correct data rate.

The SS7 Gateway is a device for integrating traditional Signaling System 7 (SS7) and packet-switched networks. The SS7 Gateway may be positioned between SS7 nodes in traditional telephone networks and utilizes next generation SS7/IP signaling protocols, such as the sctp and ietf protocols below to route SS7 messages transparently over IP networks. The SS7 Gateway preferably utilizes the SCTP (SIGTRAN) protocol, and the most recent SS7/IP signaling inter-working standard from the Internet Engineering Task Force (IETF). Information about the standard is available from http://search.ietf.org:80/html.charters/sigtran-charter.html, in a series of drafts, the contents of which are hereby incorporated by reference.

The SS7 Gateway preferably includes the following features:

1. It does not appear as an SS7 network node or require a point code, in other words its presence is transparent to the network.
2. It may be implemented with a small physical footprint to fit in a standard telecom rack.
3. As mentioned above it utilizes SCTP (SIGTRAN)—the IETF transport layer protocol.
4. It preferably comprises access ports which support T1, E1, J1, or V.35 connections.
5. It preferably comprises a graphical user interface that can be remotely monitored and configured.

The SS7 Gateway 150 additionally provides support for the SCTP, IETF SIGTRAN standard for SS7/IP message transport. SCTP preferably provides the software backbone of the SS7 Gateway, thereby ensuring reliable signaling message transport over IP networks.

The SS7 Gateway 150 preferably also utilizes a software adaptation layer to transport various SS7 message types and procedures over SCTP. Much like TCP, SCTP uses a message acknowledgement and retransmission scheme that ensures message delivery to the remote end. SCTP provides multiple message streams, to allow bypassing and thereby minimizing the head-of-the-line blocking effect that can be a disadvantage with TCP.

As explained above, the SS7 Gateway 150 provides important inter-working functionality. Nonetheless it is virtually invisible to the SS7 and IP networks in which it operates. In PSTN signaling networks, the SS7 Gateway does not require a point code or network reconfiguration, unlike SSPs, STPs, and SCPs, which require unique identifiers, or point codes.

There is thus provided a system and method and a series of embodiments for providing backup to existing communication networks, which may include an ability to bridge between telephony and IP protocols.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A branch of a cellular telephone network based on a first synchronous data communication protocol, comprising interfaces to a satellite link using a second, asynchronous, data communication protocol, wherein said interfaces comprise converters for converting data of a datastream between said first data communication protocol and said second data communication protocol, and wherein said synchronous data protocol allows non-data carrying time slots, and said interfaces comprising a non-data carrying time slot remover for removing said non-data carrying time slots during conversion into said asynchronous protocol and a time slot regenerator for regenerating non-data carrying time slots during reconstruction of said datastream.

2. The branch of claim 1, being one of peripheral branches of a telephone network, the peripheral branches being connected to a central high-capacity data trunking region and, wherein said first synchronous protocol is the E1 protocol and wherein said second, synchronous protocol is the TCP/IP protocol, said high-capacity data trunking region comprises a satellite interface for a satellite connection using a TCP/IP protocol, said satellite interface comprising said converter, said converter being an E1-TCP/IP converter being operable to receive E1 signaling containing SS7 control signaling distributed therein at a predetermined data rate, said converter using a multiplexer for converting between the E1 signal and the TCP/IP signal;

wherein said high capacity trunking region comprises a terrestrial high capacity trunking connection in parallel with said satellite connection such that said satellite connection is usable to back up said terrestrial connection.

3. A cellular telephone network according to claim 2, wherein said high capacity data trunking region comprises a terrestrial high capacity trunking connection in parallel with said satellite connection such that said terrestrial high capacity trunking connection is usable to back up said satellite connection.

4. A cellular telephone network according to claim 2, wherein said satellite link is via geostationary orbit satellite.

5. A cellular telephone network according to claim 2, wherein said E1-TCP/IP converter is operable to receive E1 signaling containing SS7 control signaling distributed therein at a predetermined data rate, said converter comprising an extractor for extracting said SS7 signaling, and a TCP/IP packet former for arranging said extracted signaling into TCP/IP packets.

6. A cellular telephone network according to claim 4, wherein said E1-TCP/IP converter comprises an encoder for encoding synchronization control data describing said E1 signal into headers of TCP/IP packets, thereby to enable subsequent synchronous reconstruction of said E1 signal.

7. A cellular telephone network according to claim 2, wherein at least one of said peripheral branches comprises a satellite link and an E1-TCP/IP interface.

8. The branch of claim 1, wherein said first synchronous data protocol is the E1 protocol, the branches comprising interfaces to a satellite link, wherein the second, asynchronous protocol is the TCP/IP protocol, wherein said converters at said interfaces comprise E1-TCP/IP converters for converting data between said E1 protocol and said TCP/IP protocol, wherein said interfaces comprising encoders for encoding synchronization control information of said E1 protocol when encoding data of said E1 protocol into said TCP/IP protocol, thereby to enable reconstruction of a signal in said E1 protocol from data in said TCP/IP protocol, which reconstructed data retains said synchronization, each one of said E1-TCP/IP converters using a multiplexer for converting between the E1 signal and the TCP/IP signal.

9. A branch according to claim 8, wherein said interfaces are arranged to provide said satellite link as a parallel path to a terrestrial data link.

10. A branch according to claim 8 further comprising at least one base station connected to at least one mobile switching center, said at least one mobile switching center being associated with at least one location register, and wherein said satellite link is arranged to connect said at least one mobile switching center with said at least one location register.

11. A branch according to claim 8 wherein said interfaces comprising decoders operable to decode synchronization control information from data arriving from said link, to reconstruct a synchronized telephony protocol data stream.

12. A branch according to claim 11, said interface further comprising a buffer controllable according to said decoded synchronization information to recreate time delay relationships of said telephony protocol data stream.

* * * * *

UNITED STATES PATENT AND TRADEMARK OFFICE
CERTIFICATE OF CORRECTION

PATENT NO. : 7,245,874 B2 Page 1 of 1
APPLICATION NO. : 09/918443
DATED : July 17, 2007
INVENTOR(S) : Yehuda Rest et al.

It is certified that error appears in the above-identified patent and that said Letters Patent is hereby corrected as shown below:

In claim 2, line 5, column 15, line 36 "synchronous", should be corrected to: -- asynchronous --.

Signed and Sealed this

Fourteenth Day of October, 2008

JON W. DUDAS
*Director of the United States Patent and Trademark Office*